(12) United States Patent
Lickfelt

(10) Patent No.: US 8,473,153 B1
(45) Date of Patent: Jun. 25, 2013

(54) KEY FOB BATTERY LIFE PRESERVATION SYSTEM AND METHOD

(75) Inventor: Brian K. Lickfelt, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 77 days.

(21) Appl. No.: 13/334,600

(22) Filed: Dec. 22, 2011

(51) Int. Cl.
*G06F 7/00* (2006.01)

(52) U.S. Cl.
USPC .................................. 701/36; 701/2

(58) Field of Classification Search
USPC ......................................... 701/2, 36
See application file for complete search history.

(56) References Cited

U.S. PATENT DOCUMENTS

| | | | |
|---|---|---|---|
| 6,759,760 B2 | 7/2004 | Gaynier et al. | |
| 7,009,491 B2 * | 3/2006 | Rodriguez et al. | 340/5.72 |
| 7,015,791 B2 | 3/2006 | Huntzicker | |
| 7,109,852 B2 * | 9/2006 | Gupte et al. | 340/426.26 |
| 7,292,137 B2 * | 11/2007 | Gilbert et al. | 340/426.3 |
| 7,501,931 B2 | 3/2009 | Ueda et al. | |
| 7,629,876 B2 | 12/2009 | Nagai et al. | |
| 7,948,359 B2 | 5/2011 | Marcelle et al. | |
| 2005/0179546 A1 * | 8/2005 | Lanigan et al. | 340/545.6 |
| 2006/0294393 A1 | 12/2006 | McCall | |
| 2009/0261945 A1 | 10/2009 | Ko et al. | |
| 2010/0007462 A1 * | 1/2010 | Biondo et al. | 340/5.72 |
| 2010/0244560 A1 * | 9/2010 | Sato et al. | 307/10.1 |
| 2010/0304690 A1 | 12/2010 | Proefke et al. | |
| 2010/0305779 A1 * | 12/2010 | Hassan et al. | 701/2 |
| 2011/0106330 A1 | 5/2011 | Lickfelt | |

\* cited by examiner

*Primary Examiner* — Hussein A. Elchanti
(74) *Attorney, Agent, or Firm* — Rankin, Hill & Clark LLP

(57) ABSTRACT

A system for transitioning a key fob between a standard operating mode and a battery conserving shipping mode includes a shipping mode controller which detects a vehicle state indicative of a vehicle shipping mode operation having been performed, and causes a shipping mode instruction signal to be sent from a vehicle to the key fob associated with that vehicle instructing the key fob to transition from the standard operating mode to the shipping mode. The vehicle shipping mode operation is an operation which initiates a transition of the vehicle from a standard operating mode to a shipping mode, and serves as a trigger for the shipping mode controller to transmit the shipping mode instruction signal. When in the shipping mode, the key fob may be entirely powered-off or have certain communication-related functions disabled.

20 Claims, 2 Drawing Sheets

KEY FOB BATTERY LIFE PRESERVATION SYSTEM AND METHOD

BACKGROUND

To improve user convenience, many modern vehicles are provided with remote keyless entry (RKE) and SMART key systems which allow for certain vehicle functions to be triggered and/or enabled without physical use of a vehicle key or input from a user to a key fob. For example, a proximity between the key fob and an associated vehicle may be monitored or detected, and used as a trigger to turn on vehicle welcome lighting or unlock vehicle doors. Additionally, vehicle starting may be enabled via actuation of a button in the vehicle, without physical use of a key or input to the key fob, when the key fob is detected as being within the vehicle cabin.

These RKE and SMART key systems may utilize a portable communicating device, e.g., the key fob, which may be carried with the user. To enable the RKE and SMART key system functions, the key fob may perform a polling operation during which the key fob attempts to locate and identify the vehicle associated therewith. The polling operation may be performed periodically when the key fob has not located and identified the associated vehicle. Due to the significant amount of time during which the key fob may be outside of a communication range with the associated vehicle, a majority of a key fob's battery life may be consumed performing the polling operation.

Further in this regard, following assembly of the key fob and pairing with a SMART Main Unit (which is mounted in a vehicle) at a key fob manufacturing facility, the key fob may spend a significant amount of time (e.g., days or months) in storage and shipment until received at a vehicle assembly/production facility (i.e., key fob manufacturing facility assembly and kitting, key fob manufacturing facility storage, key fob manufacturing facility shipping, warehousing, etc.). Once at the vehicle assembly/production facility and assembled with a vehicle (i.e., the SMART Main Unit is mounted in the vehicle), the key fob may again spend a significant amount of time in storage and shipment (i.e., storage at a production/assembly facility, shipment from the production/assembly facility to a sales location, storage at the sales location, etc.). During the storage and shipping periods, the key fob continues performance of the polling operation, thereby consuming battery life and shortening the useful life of the key fob battery. Moreover, prior to storage and shipping, the vehicle may be transitioned to a shipping mode during which the vehicle-based RKE and SMART key system related communication functions are disabled. As such, the key fob may perform the polling operation during the storage and shipping period without the corresponding vehicle-based systems providing a capability for location and identification of the associated vehicle.

Consequently, a significant portion of the key fob battery life may be consumed during the storage and shipping period. In some cases, it is estimated that the expected battery life for a vehicle key fob may be reduced by several months due to this battery consumption. Accordingly, useful key fob battery life may be increased by accounting for the storage and shipping period.

SUMMARY

According to one aspect, a method is provided for transitioning a vehicle key fob between a standard operating mode and a battery-conserving shipping mode. The method comprises detecting a vehicle state indicative of a vehicle shipping mode operation having been performed, and transmitting a shipping mode instruction signal from the vehicle to the key fob. The vehicle shipping mode operation is an operation for at least partially initiating a transition of a vehicle associated with the key fob from a standard operating mode to a shipping mode. The shipping mode instruction signal instructs the key fob to transition from the standard operating mode to the shipping mode, and the transmission of the shipping mode instruction signal is triggered by the detection of the vehicle state indicative of the vehicle shipping mode operation having been performed.

According to another aspect, a key fob shipping mode transitioning system is provided with a key fob, a communication device, and a shipping mode controller. The key fob is configured to be operable in at least a standard operating mode and a battery-conserving shipping mode, and to transmit and receive signals. The communication device is mounted in a vehicle associated with the key fob and is configured to transmit signals to and receive signals from the key fob. The shipping mode controller is configured to detect a vehicle state indicative of a vehicle shipping mode operation having been performed, where the vehicle shipping mode operation is an operation performed to at least partially initiate a transition of the vehicle from a standard operating mode to a shipping mode. The shipping mode controller is also configured to control the communication device to transmit a shipping mode instruction signal to the key fob following detection of the vehicle state indicative of the vehicle shipping mode operation having been performed and prior to completion of the transition of the vehicle to the shipping mode. The shipping mode instruction signal instructs the key fob to transition from the standard operating mode to the shipping mode.

According to yet another aspect, a shipping mode controller for controlling a key fob to transition between a standard operating mode and a battery-conserving shipping mode is provided with a shipping fuse state-detecting section and a vehicle communication device controller. The shipping fuse state-detecting section is configured to detect removal of a shipping fuse from a vehicle fuse box, where the shipping fuse is a fuse provided such that removal thereof at least partially transitions the vehicle into a shipping mode. The vehicle communication device controller is configured to control a vehicle communication device to transmit a shipping mode instruction signal to the key fob following detection of removal of the shipping fuse from the vehicle fuse box by the shipping fuse state-detecting section. The shipping mode instruction signal instructs the key fob to transition from the standard operating mode to the shipping mode.

DETAILED DESCRIPTION

Figure 1A:
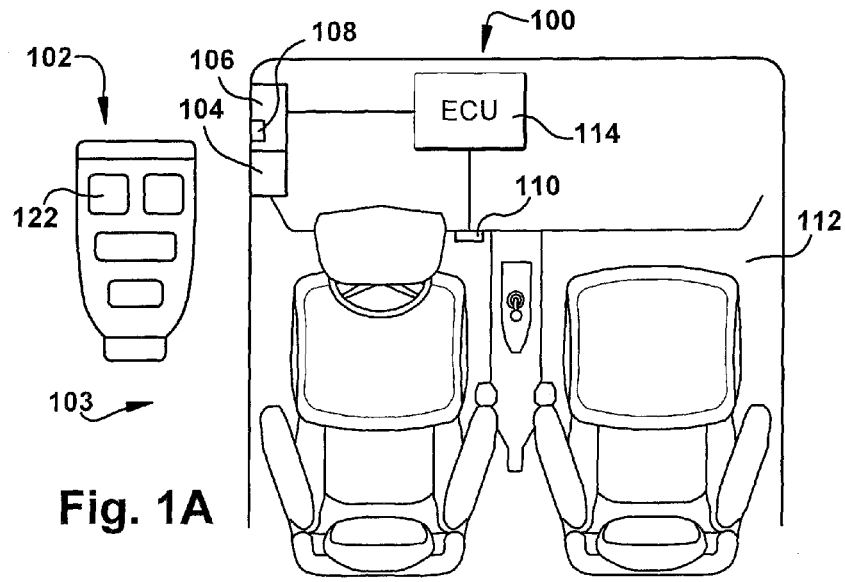
FIG. 1A is a schematic illustration of a key fob shipping mode transitioning system provided by a vehicle and an associated key fob.

FIG. 1A illustrates an exemplary vehicle 100 and key fob 102 associated with the vehicle 100, which include a key fob shipping mode transitioning system 103. The vehicle 100 and key fob 102 may be configured for remote keyless entry (RKE) functionality, SMART key functionality, and/or for user instructions input to the key fob 102 to be communicated to and followed by the vehicle 100 (user-instructed functionality). As noted in the background section, when configured for RKE, SMART key, and/or other types of functionality the vehicle 100 and key fob 102 may also be configured for the key fob 102 to perform a polling operation for locating and identifying the vehicle 100. The RKE, SMART key, and user-instructed functionality of the vehicle 100 and key fob 102 are considered generally well known, and will therefore only be further described below where relevant to the key fob shipping mode transitioning system 103.

The illustrated vehicle 100 includes a vehicle power source 104, a fuse box 106 housing and removably holding at least a shipping fuse 108, a vehicle power switch 110 housed in a vehicle passenger compartment 112, and an electronic unit (ECU) 114. As is described in further detail below, the ECU 114 is connected to and in communication with the fuse box 106 and the vehicle power switch 110, and is connected to and powered by the vehicle power source 104 with the fuse box 106 interposed therebetween. The key fob 102 refers to a portable communicating device configured to receive user inputs via an input section 122 and to communicate with the vehicle 100 (i.e., the ECU 114) according to the RKE, SMART key, and/or user-instructed functionality, and may also be configured to operate as a physical key capable of interacting with the vehicle power switch 110 to initiate power-on and power-off the vehicle 100.

The vehicle power source 104 may be a standard vehicle battery or any other power source suitable for electrically powering vehicle functions, including those functions related to communication with the key fob 102 to enable RKE, SMART key, and/or user-instructed functionality. The vehicle power source 104 is connected to the vehicle ECU 114 via a circuit having the fuse box 106 interposed therebetween. The fuse box 106 may take the form of a standard fuse box which may house and hold a plurality of vehicle fuses (not shown), or may be any other device configured to operate in a manner similar to that of a fuse box. The vehicle power source 104 and fuse box 106 are considered to be generally well known, and will therefore only be further described below where relevant to the key fob shipping mode transitioning system 103. For purposes of this disclosure, the fuse box 106 will be considered as housing a plurality of removable fuses, where the removal of each fuse disrupts a specific circuit unique to that fuse and disconnects particular vehicle components from the vehicle power source 104, thereby disabling particular vehicle functions.

The shipping fuse 108 may be provided as one of the plurality of fuses removably held in the fuse box 106. Alternatively, the shipping fuse 108 may have a dedicated fuse box 106 wherein only the shipping fuse 108 is held. Regardless, the shipping fuse 108 is provided such that when held in the fuse box 106, the vehicle 100 is in a standard operating mode, and when removed the transition of the vehicle 100 to a shipping mode is at least partially initiated. When in the standard operating mode, all vehicle components may be connected to the vehicle power source 104 and all vehicle functions may be operable. When in the shipping mode, certain vehicle components are disconnected from the vehicle power source 104, disabling certain vehicle functions. The shipping fuse 108 and the transition of the vehicle 100 between the standard operating mode and shipping mode is described in further detail in U.S. patent application Ser. No. 12/610,677 (U.S. Patent Application Publication No. 2011/0106330) to Lickfelt (assigned to Honda Motor Co., Ltd.), the content of which is hereby incorporated in full by reference.

Generally, the shipping fuse 108 is provided to disconnect those vehicle components associated with vehicle functions not necessary during a storage and shipping period of the vehicle 100 from the vehicle power source 104. The storage and shipping period may be a time period between production/assembly and use by a user, which can include storage at a production/assembly facility, shipment from the production/assembly facility to a sales location, storage at the sales location, etc. The vehicle components disconnected from the vehicle power source 104 when the shipping fuse 108 is removed, and the vehicle functions which are thereby disabled, may include any components and functions which are not necessary or used during the storage and shipping period. By disconnecting these components from the vehicle power source 104 and disabling these vehicle functions, consumption of the vehicle power source 104 is reduced during the storage and shipping period, and the useful life of the vehicle power source 104 is thereby increased. The features disabled by removal of the shipping fuse 108 may at least include those communication related features which enable RKE, SMART key, and/or user-instructed functionality with the key fob 102. These features are disabled by having the enabling components disconnected from the vehicle power source 104.

The removal of the shipping fuse 108 at least partially initiates the transition of the vehicle 100 from the standard operating mode to the shipping mode by disconnecting at least those vehicle components which enable communication with the key fob 102 for purposes of RKE, SMART key, and/or user-instructed functionality from the power source 104 (e.g., controllers, transmitter, receivers, transceivers, etc.), thereby disabling the RKE, SMART key, and/or user-instructed functionality. Even when the shipping fuse 108 is removed from the fuse box 106, the vehicle 100 may still be operated in a limited manner (excepting those vehicle functions disabled by removal of the shipping fuse 108) via physical use of the key fob 102 or associated key, such as by placing the key fob in a key fob slot (not shown) provided at the vehicle power switch 110, holding the key fob 102 against a start button (not shown) provided by/with the vehicle power switch 100, etc. Furthermore, while the above-listed communication related features of the vehicle 100 may be disabled, the vehicle 100 may still be capable of some communication with the key fob 102, as is described in further detail below.

The vehicle shipping mode may be a vehicle state in which the vehicle functions associated with the shipping fuse 108 are disabled (i.e., the shipping fuse 108 is removed from the fuse box 106), irrespective of whether the vehicle 100 is powered-on or powered-off. As such, the vehicle shipping mode operation for transitioning the vehicle 100 from the standard operating mode to the shipping mode may only include the removal of the shipping fuse 108 from the fuse box 106 (i.e., removal of the shipping fuse 108 from the fuse box 106 entirely initiates and causes the vehicle 100 to transition to the shipping mode). Alternatively, the vehicle shipping mode may be a vehicle state in which the vehicle functions associated with removal of the shipping fuse 108 are disabled (i.e., the shipping fuse 108 is removed from the fuse box 106) and the vehicle 100 is powered-off. As such, the vehicle shipping mode operation for transitioning the vehicle 100 from the standard operating mode to the shipping mode may include removing the shipping fuse 108 and actuating the power switch 110 to transmit a power-off signal and initiate power-off of the vehicle 100. The vehicle shipping mode operation including the removal of the shipping fuse 108 from the fuse box 106 and the actuation of the vehicle power switch 110 may be performed in either order. Moreover, it is to be appreciated that additional functions not discussed herein may be added to the vehicle shipping mode operation.

The vehicle power switch 110 can be a switch housed in a vehicle passenger compartment 112 which may be actuated to power-on (start) and power-off the vehicle 100 (i.e., transmit a power-on and/or power-off signal instructing power-on and/or power-off of the vehicle 100). The vehicle power switch 110 may be provided via a button which is actuated by being pressed by the user, a key insertion and turning mechanism, or any other mechanism for initiating power-on/off of the vehicle 100. It is noted that in RKE and/or SMART key enabled vehicles, the vehicle power switch 110 (via the ECU 114 or a different controller not illustrated in the drawings) may also have some functionality related to detecting and/or identifying the associated key fob 102 as being within a predefined vicinity of the vehicle 100, such as within the passenger compartment 112 or pressed against a portion of the vehicle power switch 110, and enabling starting or powering-on (e.g., via pressing a power button) upon such detection.

The vehicle ECU 114 may be provided to control various vehicle functions, including at least communications (with the key fob 102) and processing related to the RKE, SMART key, and user-instructed functionality. In this regard, the ECU 114 may be or may include a SMART Main Unit. The vehicle ECU 114 may be provided as a single processor or a plurality of processors which is/are configured to perform the herein described functions. The ECU 114 may be integrated or otherwise associated with a central control unit for the vehicle 100, or may be provided as a separate unit for controlling the RKE, SMART key, and user-instructed functionality and/or for enabling the key fob shipping mode transitioning system 103. As noted above, the ECU 114 may be in circuit with the shipping fuse 108 such that removal of the shipping fuse 108 from the fuse box 106 disconnects the ECU 114 from the power source 104. Alternatively, the ECU 114 may only be partially in circuit with the shipping fuse 108 such that removal of the shipping fuse 108 only disconnects certain portions (i.e., disables only certain functions) of the ECU 114, or may not be in circuit with the shipping fuse 108 at all. Regardless, the ECU 114 may be in communication with the fuse box 106, as is discussed below.

Figure 1B:
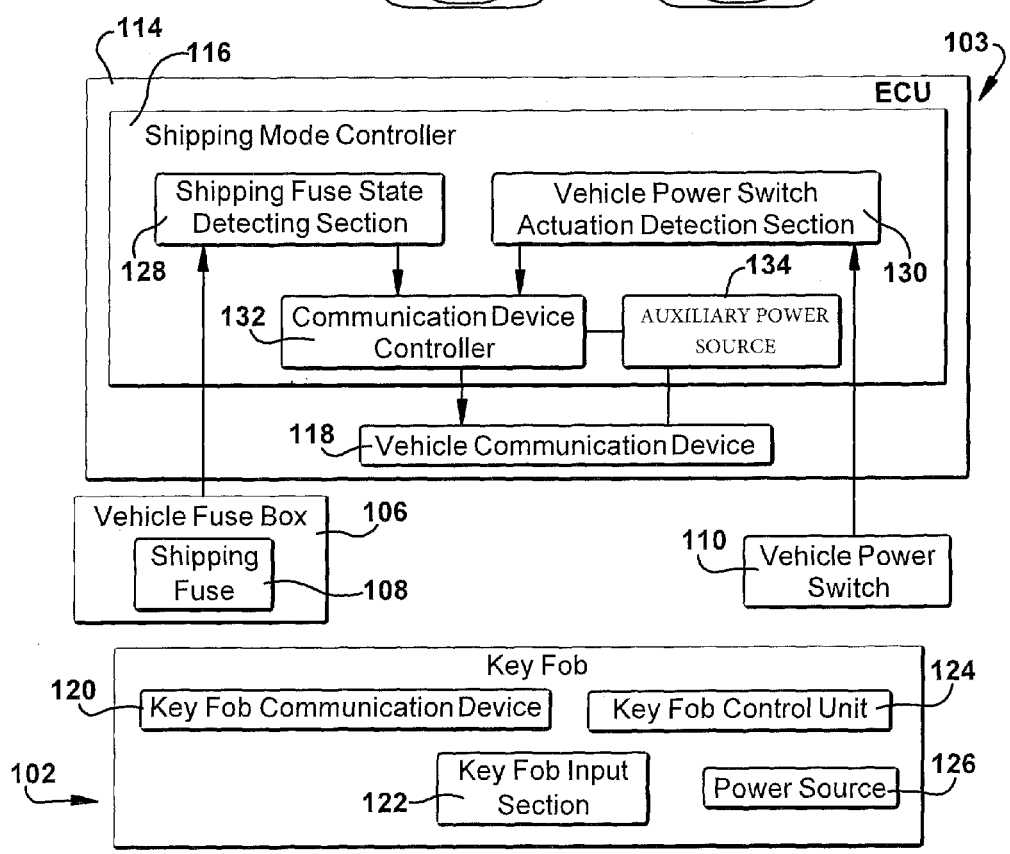
FIG. 1B is a block schematic illustration of a vehicle electronic control unit and the key fob associated with the vehicle which include the key fob shipping mode transitioning system.

Turning to FIG. 1B, the ECU 114 at least includes a shipping mode controller 116 and a vehicle communication device 118. The shipping mode controller 116 is in communication with the vehicle fuse box 106, the vehicle power switch 110, and the vehicle communication device 118. The shipping mode controller 116 may take the form of one or more processors configured to detect a vehicle state indicative of the vehicle shipping mode operation having been performed, and to control the vehicle communication device 118 to transmit a shipping mode instruction signal to the key fob 102 when the vehicle state indicative of the vehicle shipping mode operation having been performed is detected.

The vehicle communication device 118 is mounted in the vehicle 100 (e.g., in the ECU 114) and is configured to transmit signals to and receive signals from the key fob 102. The vehicle communication device 118 may take the form of any transmitting and receiving device capable of communicating with the key fob 102 to enable RKE, SMART key, user-instructed functionality, and/or other functionality. For example, the vehicle communication device 118 may include an LF transmitter, RF transmitter, LF receiver, RF receiver, and/or a transceiver.

As also shown in FIG. 1B, the key fob 102 includes a key fob communication device 120, the key fob input section 122, a key fob control unit 124, and a key fob power source 126. The key fob communication device 120 is configured to communicate with the vehicle communication device 118 by transmitting signals to and receiving signals from the vehicle communication device 118, and may take the form of any transmitting and receiving device capable of communicating with the vehicle communication device 118 to enable RKE, SMART key, and/or user-instructed functionality. For example the key fob communication device 120 may include an LF transmitter, RF transmitter, LF receiver, RF receiver, and/or a transceiver. The key fob input section 122 may include a plurality of buttons or switches which may be actuated or pressed by the user to allow the user to input instructions for user-instructed functionality. The key fob control unit 124 may take the form of one or more processors configured to control operation of the key fob 102, including at least processing of user instructions input via the key fob input section 122, controlling the key fob communication device 120 to transmit specific signals to the vehicle communication device 118, performing the polling operation, etc. The key fob power source 126 is provided to power the key fob 102, and may be provided as a standard battery cell or any other type of power source which may be used in a key fob 102.

The key fob 102 is operable in a standard operating mode and a battery (key fob power source 126) conserving shipping mode. In this regard, the key fob control unit 124 is also operable to transition the key fob 102 between the standard operating mode and the battery conserving shipping mode when the shipping mode instruction signal is received by the key fob communication device 120 from the vehicle communication device 118, and to control the key fob communication device 120 to send a confirmation signal to the shipping mode controller 116 and vehicle communication device 118 indicating that the shipping mode instruction signal has been received. It is noted that during the storage and shipping period, the key fob 102 in the standard operating mode may continue to perform the polling operation (or other processing operations) though the vehicle 100 is in the shipping mode. Continuing the polling and other operations consumes power from the key fob power source 126, thereby reducing the useful life thereof. Moreover, as the RKE, SMART key, and user-instructed functionality related communication functions of the vehicle 100 are disabled when in the shipping mode (or when the shipping fuse 108 is removed from the fuse box 106), the key fob 102 polling operation may not be needed or useful as the key fob 102 will not locate and/or identify the vehicle 100 when the vehicle 100 is incapable of similar communication with the key fob 102.

Accordingly, by transitioning the key fob 102 to the battery conserving shipping mode while the vehicle 100 is in the shipping mode, the consumption of the key fob power source 126 may be reduced and the useful life of the key fob power source 126 may be increased. In the key fob shipping mode, the key fob 102 may be entirely powered-off, may have all polling operation related communication functions disabled, may have all RKE and SMART key function related communications disabled, and/or may have all communication related functions disabled. As used herein, disabling all communication related functions of the key fob 102 means preventing the transmission or receipt of any communicative signals by the key fob communication device 120. As used herein, entirely powering-off the key fob 102 means powering-off all components of the key fob 102 other than those necessary to allow the key fob 102 to wake up by an operation discussed in further detail below. By maintaining the key fob 102 in the shipping mode during the storage and shipping period, the life of the key fob power source 126 may be increased by several months or more.

The transition of the key fob 102 between the standard operating mode and the shipping mode can be controlled by the key fob shipping mode transitioning system 103, which is provided by the key fob 102, the vehicle communication device 118, and the shipping mode controller 116. In this regard, the shipping mode controller 116 further includes a shipping fuse state-detecting section 128, a vehicle power switch actuation detection section 130, a communication device controller 132, and an auxiliary power source 134. The shipping mode controller 116 and the vehicle communication device 118 may be in circuit with the shipping fuse 108 such that removal of the shipping fuse 108 from the fuse box 106 disconnects the shipping mode controller 116 and the vehicle communication device 118 from the power source 104. Alternatively, the shipping mode controller 116 and vehicle communication device 118 may not be in circuit with the shipping fuse 108 so as to remain connected to the vehicle power source 104 even when the shipping fuse 108 is removed and the vehicle 100 is in the shipping mode.

Generally, the shipping fuse state detecting section 128 and the vehicle power switch actuation detection section 130 are provided to detect the vehicle state indicative of the vehicle shipping mode operation (for transitioning the vehicle from the standard operating mode to the shipping mode) having been performed. The communication device controller 132 is provided to control the vehicle communication device 118 to transmit the shipping mode instruction signal to the key fob 102. The auxiliary power source 134 is provided to power the communication device controller and the vehicle communication device 118 once the shipping fuse 108 has been removed.

More particularly, the shipping fuse state detecting section 128 is in communication with the vehicle fuse box 106 and is configured to detect whether the shipping fuse 108 is held in the vehicle fuse box 106 or is removed from the vehicle fuse box 106. The shipping fuse state detecting section 128 may take the form of any device capable of detecting whether the shipping fuse 108 is held in the fuse box 106. For example, the shipping fuse state detecting section 128 may be a switch which shifts between open and closed positions when an electric current is supplied thereto and deprived therefrom, with the electrical current being supplied when the shipping fuse 108 is held in the fuse box 106 and deprived when the shipping fuse 108 is removed from the fuse box 106. The shipping fuse state detecting section 128, and/or the shipping mode controller 116, may be configured to detect the position of the switch (or whether the electrical current is being supplied through the circuit in which the shipping fuse 108 is provided) to determine whether the shipping fuse 108 is held/housed in the fuse box 106 or is removed from the fuse box 106.

The vehicle power switch actuation detection section 130 is in communication with the vehicle power switch 110 and is configured to detect an actuation of the vehicle power switch 110 to instruct power-off of the vehicle 100. In this regard, when the vehicle power switch 110 is actuated to power-on or power-off the vehicle 100, a signal is transmitted therefrom to, for example, a vehicle central control unit and/or the ECU 114. The vehicle power switch actuation detection section 130 is also in communication with the vehicle power switch 110 so as to receive the power-off signal sent therefrom, and to thereby detect an actuation of the vehicle power switch 110 when the power-on or power-off signal is received.

As noted above, the shipping mode operation for transitioning the vehicle 100 from the standard operating mode to the shipping mode may include either only removing the shipping fuse 108 from the fuse box 106, or both removing the shipping fuse 108 from the fuse box 106 and actuating the vehicle power switch 110 to transmit the power-off signal. In the former configuration, the vehicle power switch actuation detection section 130 may be removed from the shipping mode controller 116, and the shipping mode controller 116 may be configured to detect the vehicle state indicative of the shipping mode operation having been performed using the shipping fuse state detecting section 128 alone. In the later configuration, the shipping mode controller 116 is configured to detect the vehicle state indicative of the shipping mode operation having been performed using the shipping fuse state detecting section 128 and the vehicle power switch actuation detection section 130 (as illustrated).

The shipping fuse state-detecting section 128 and the vehicle power switch actuation detection section 130 are both in communication with the communication device controller 132, and the communication device controller 132 is connected to and selectively controls the vehicle communication device 118. Particularly, the communication device controller 132 is configured to receive signals from the shipping fuse state detecting section 128 and the vehicle power switch actuation detection section 130 which indicate a detection of the vehicle state indicative of the vehicle shipping mode operation having been performed. When these signals are received, the communication device controller 132 is configured to control the vehicle communication device 118 to transmit the shipping mode instruction signal to the key fob 102, where the shipping mode instruction signal is a signal instructing the key fob 102 to transition from the standard operating mode to the shipping mode. For example, the shipping mode instruction signal may be transmitted as an LF signal from an LF transmitter or transceiver of the vehicle communication device 118.

Once transmitted, the shipping mode instruction signal is received by the key fob communication device 120 and processed by the key fob control unit 124, which causes the key fob 102 to transition from the standard operating mode to the shipping mode in accordance with the shipping mode instruction signal. The key fob control unit 124 also causes the key fob communication device 120 to send the confirmation signal to the shipping mode controller 116 and the vehicle communication device 118 indicating that the shipping mode instruction signal has been received. The shipping mode controller 116 may be configured to await receipt of the confirmation signal for a predetermined period of time, and to resend the shipping mode instruction signal periodically until the confirmation signal is received.

The auxiliary power source 134 is provided in the shipping mode controller 116 to power the communication device controller 132 (and/or the shipping mode controller 116) and the vehicle communication device 118 to detect the vehicle state indicative of the vehicle shipping mode operation having been performed and to transmit the shipping mode signal to the key fob 102. In this regard, in a configuration wherein the shipping mode controller 116 and/or the vehicle communication device 118 are in circuit with the shipping fuse 108, removal of the shipping fuse may disconnect these components from the power source 104. The auxiliary power source 134 therefore allows for limited continued operation of the shipping mode controller 116 and vehicle communication device 118 following disconnection from the power source 104. It is noted that in configurations where the shipping mode controller 116 and vehicle communication device 118 are not in circuit with the shipping fuse 108, the auxiliary power source 134 may be omitted. The auxiliary power source 134 may be provided as a secondary input from the vehicle power source 103 which is not in series with the shipping fuse 108.

Figure 2:
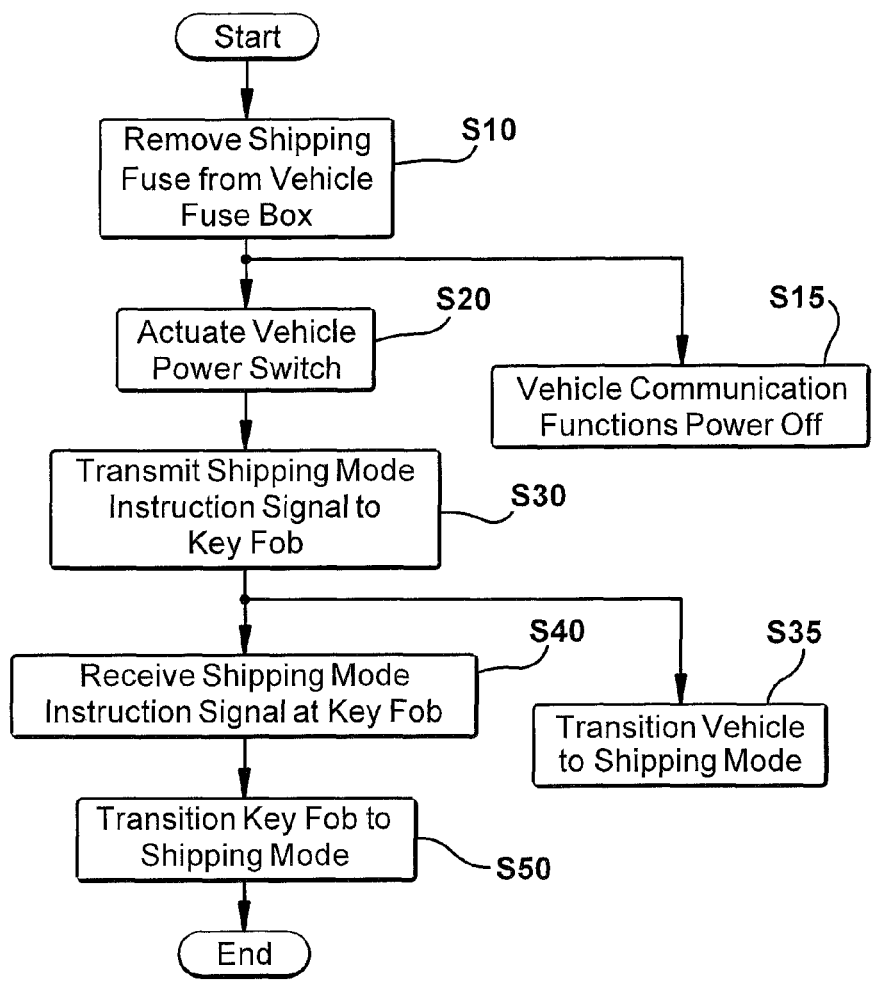
FIG. 2 is a flow chart illustrating a method for transitioning the key fob from a standard operating mode to a battery-conserving shipping mode.

A method for operation of the key fob shipping mode transitioning system 103 for transitioning the vehicle key fob 102 from the standard operating mode to the shipping mode is described with reference to FIG. 2. Generally, the method includes performing the vehicle shipping mode operation, detecting the vehicle state indicative of the vehicle shipping mode operation having been performed, and transmitting the shipping mode instruction signal to the key fob 102 prior to (or concurrently with) transitioning the vehicle 100 into the shipping mode. The shipping mode instruction signal is received by the key fob 102 and causes the key fob 102 to transition from the standard operating mode to the shipping mode. The method will initially be described with respect to the key fob shipping mode transitioning system 103 wherein performing the vehicle shipping mode operation includes both removing the shipping fuse 108 and actuating the vehicle power switch 110 to transmit the power-off signal, and wherein the shipping mode controller 116 and vehicle communication device 118 are in circuit with the shipping fuse 108.

With initial reference to the performance of the vehicle shipping mode operation, the method for transitioning the key fob 102 from standard operating mode to the shipping mode begins with removing the shipping fuse 108 from the vehicle fuse box 106 (S10). Removal of the shipping fuse 108 from the fuse box 106 may be manually accomplished by a user and disrupts the circuit in which the shipping fuse 108 is provided, thereby disabling those vehicle functions associated with the circuit of the shipping fuse 108. As noted above, removal of the shipping fuse 108 at least disables the vehicle communication functions related to RKE, SMART key, and user-instructed functionality (S15), and disconnects the shipping mode controller 116 and vehicle communication device 118 from the vehicle power source 104. Once the shipping fuse 108 is removed, the shipping mode controller 116 and vehicle communication device 118 may be powered by the auxiliary power source 134.

The performance of the vehicle shipping mode operation also includes actuating the vehicle power switch 110 to instruct the vehicle 100 to power-off (S20). The vehicle power switch 110 may actuated by the user (e.g., a button is pressed), and when actuated while the vehicle 100 is powered-on, causes the power-off signal to be transmitted from the vehicle power switch 110 to the central control unit of the vehicle (e.g., the ECU 114). Once received by the central control unit, the vehicle 100 is made to power-off. As the vehicle 100 is in the shipping mode when the shipping fuse 108 is removed and the vehicle 100 is powered-off, the performance of the vehicle shipping mode operation initiates or triggers transition of the vehicle from the standard operating mode to the shipping mode.

Following the performance of the vehicle shipping mode operation, the vehicle state indicative of the vehicle shipping mode operation having been performed is detected. In this regard, when the shipping fuse 108 is removed from the fuse box 106, the shipping fuse state detecting section 128 detects the removal. Furthermore, the power-off signal transmitted from the vehicle power switch 110 following actuation thereof is received by the vehicle power switch actuation detection section 130. When the shipping fuse state detecting section 128 detects the shipping fuse 108 as being removed from the fuse box 106 and the vehicle power switch actuation detection section 130 detects the actuation of the vehicle power switch 110 to transmit the power-off signal, the shipping mode controller 116 detects the vehicle state indicative of the vehicle shipping mode operation having been performed.

When the vehicle state indicative of the vehicle shipping mode operation having been performed is detected, a signal indicating such is transmitted to the communication device controller 132 of the shipping mode controller 116. When the signal is received, the communication device controller 132 controls the vehicle communication device 118 to transmit the shipping mode instruction signal to the key fob 102 (S30). It is noted that once the vehicle shipping mode operation is performed, the vehicle 100 is in the process of transitioning to the shipping mode. As such, the shipping mode controller 116 (via the communication device controller 132) controls the vehicle communication device 118 to transmit the shipping mode instruction signal to the key fob 102 prior to or concurrent with the vehicle 100 transitioning to the shipping mode (i.e., prior to or concurrent with the vehicle 100 powering-off in accordance with the power-off signal transmitted due to actuation of the vehicle power switch 110). At a point in time shortly after or concurrent with the transmission of the shipping mode instruction signal to the key fob 102, the vehicle 100 transitions to the shipping mode (S35).

Once the shipping mode instruction signal is transmitted from the vehicle communication device 118, the shipping mode instruction signal is received by the key fob 102 using the key fob communication device 120 (S40). The shipping mode instruction signal is processed by the key fob control unit 122, which controls the key fob 102 to transition from the standard operating mode to the shipping mode (S50). As noted above, the shipping mode is a battery (key fob power source 126) conserving mode in which consumption of power from the key fob power source 126 is minimized. In the key fob shipping mode, the key fob 102 may be entirely powered-off, may have all polling operation related communication functions disabled, may have all RKE and SMART key function related communications disabled, and/or may have all communication related functions disabled. It is noted that when in the shipping mode, the key fob 102 may still be operable to allow for certain functions for operating the vehicle 100, such as manual engagement with the vehicle power switch 110 so as to allow the vehicle 100 to be started. The manual engagement may include insertion of the key fob 102 into a slot in the vehicle power switch 110 or placement of the key fob 102 next to the vehicle power switch 110.

It is noted that the transmission of the shipping mode instruction signal from the vehicle communication device 118 to the key fob 102 is triggered by the performance of the vehicle shipping mode operation. In other words, the shipping mode controller 116 causes the shipping mode instruction signal to be transmitted without any additional user intervention or action beyond that required for the performance of the vehicle shipping mode operation. As such, the transmission of the shipping mode instruction signal, and the transition of the key fob 102 from the standard operating mode to the shipping mode, is triggered by the performance of the vehicle shipping mode operation and detection of the vehicle state indicative of the vehicle shipping mode operation having been performed. As the vehicle shipping mode operation is currently part of the assembly/production process, the transitioning of the key fob 102 from the standard operating mode to the shipping mode is accomplished without adding any additional steps to the assembly/production process.

It is reiterated that once the shipping fuse 108 is removed, the shipping mode controller 116 and the vehicle communication device 118 may be disconnected from the vehicle power source 104 and powered by the auxiliary power source 134. However, it is to be appreciated that the key fob shipping mode transitioning system may be alternatively configured such that the shipping mode controller 116 and/or the vehicle communication device 118 are not in circuit with the shipping fuse 108, and therefore remain connected to the vehicle power source 104 even after removal of the shipping fuse 108. In this alternative configuration, the vehicle power source 104 continuously serves as the power source for the shipping mode controller 116 and vehicle communication device 118, and the auxiliary power source 134 may be omitted.

As a further alternative to the above-described method, it is again noted that the vehicle shipping mode operation for transitioning the vehicle 100 from the standard operating mode to the shipping mode may only include removal of the shipping fuse 108 from the fuse box 106 (i.e., actuation of the vehicle power switch 110 is not part of the vehicle shipping mode operation). When this is the case, the "Actuate Vehicle Power Switch" box (S20) from FIG. 2 may be removed from the method. Consistent with this operation, the vehicle 100 would be considered to be in the shipping mode when the functions associated with removal of the shipping fuse 108 are disabled, regardless of whether the vehicle 100 is powered-on or powered-off. Accordingly, once the shipping fuse state detecting section 128 detects removal of the shipping fuse 108 from the fuse box 106, the method would proceed to transmitting the shipping mode instruction signal to the key fob 102 (S30). In this regard, the key fob 102 may be transitioned to the shipping mode while the vehicle 100 is still powered-on.

Figure 3:
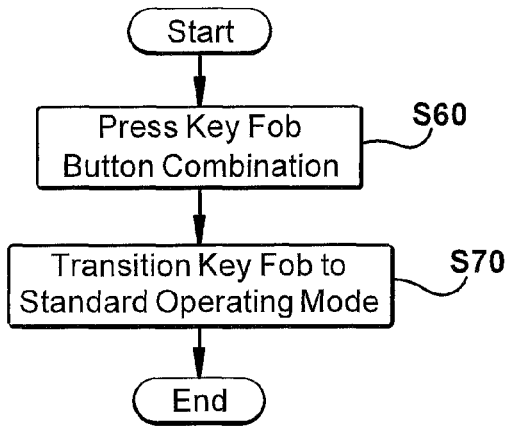
FIG. 3 is a flow chart illustrating a method for transitioning the key fob from the shipping mode to the standard operating mode.

Turning to FIG. 3, a method for operation of the key fob shipping mode transitioning system 103 for transitioning the key fob 102 from the shipping mode to the standard operating mode is illustrated. Particularly, starting with the key fob 102 in the shipping mode, a predetermined key fob button combination is pressed in the key fob input section 122 (S60). The predetermined key fob button combination may be any one or more buttons provided by the key fob input section 122 being pressed/actuated in any order or in a specific order. Once the predetermined key fob button combination is pressed, the key fob control unit 124 transitions the key fob 102 from the shipping mode to the standard operating mode. This method and functionality is provided to prevent inadvertent transition of the key fob 102 from the shipping mode back to the standard operating mode.

It is to be appreciated that the transmission of the shipping mode instruction signal from the vehicle communication device 118 (i.e., from the vehicle 100) to the key fob 102 is considered to be triggered by the performance of the vehicle shipping mode operation and detection (and detection of the performance). It is also to be appreciated that the vehicle shipping mode operation for transitioning the vehicle from the standard operating mode to the shipping mode may vary. The present method considers that upon detection of the vehicle shipping mode operation, whatever that operation may entail, the key fob 102 is caused to transition from the standard operating mode to the shipping mode.

It is noted that while the shipping fuse 108 is referenced herein, the manner in which the vehicle 100 is transitioned to the shipping mode may vary to include any other operation suitable to initiate the transition. Furthermore, while the vehicle shipping mode is described herein as being caused by the disconnection of certain vehicle components from the vehicle power source 104, the vehicle shipping mode may alternatively simply include disabling certain vehicle functions while leaving the associated components connected to the vehicle power source 104.

Additionally, the life of the key fob power source 126 may be further conserved by the key fob manufacturing facility transitioning the key fob 102 to the shipping mode following assembly and pairing with the SMART Main Unit. The key fob manufacturing facility may need different procedure for placing the key fob 102 into the shipping mode, such as the use of a centralized controller and transmitter. Once received at the vehicle assembly/production facility, the key fob 102 may need to be transitioned to the standard mode for assembly/testing, and then again transitioned to the shipping mode as described above.

It is also noted that the removal of the shipping fuse 108 from the fuse box 106 and the actuation of the vehicle power switch 110 to transmit the power-off signal may be performed in either order (i.e., S10 and S20 may be reversed). It is further noted that rather than detecting the actuation of the vehicle power switch 110, the shipping mode controller 116 (i.e., the vehicle power switch actuation detection section 130) may alternatively detect the vehicle 100 being powered-off. This may be particularly relevant or useful when the shipping fuse 108 is removed following power-off of the vehicle 100, as a need to store information regarding receipt of the power-off signal from the vehicle power switch 110 is thereby obviated.

The above may be altered by providing the auxiliary power source 134 as a capacitor which stores an electrical charge from the power source 104 when the shipping mode controller 116 is connected to the power source 104 (i.e., the shipping fuse 108 is held in the fuse box 106). Accordingly, when the shipping fuse 108 is removed, the capacitor may power the shipping mode controller 116 and the vehicle communication device 118 to detect the vehicle state indicative of the vehicle shipping mode operation having been performed and to transmit the shipping mode signal to the key fob 102.

It is also to be appreciated that in connection with the particular exemplary embodiments presented herein certain structural and/or functional features are described as being incorporated in defined elements and/or components. However, it is contemplated that these features may, to the same or similar benefit, also likewise be incorporated in common elements and/or components, or separated, where appropriate. It is also to be appreciated that different aspects of the exemplary embodiments may be selectively employed as appropriate to achieve other alternative embodiments suited for desired applications, the other alternate embodiments thereby realizing the respective advantages of the aspects incorporated herein.

Further, it is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

Further still, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for transitioning a vehicle key fob between a standard operating mode and a battery conserving shipping mode, comprising:
   detecting a vehicle state indicative of a vehicle shipping mode operation having been performed, said vehicle shipping mode operation at least partially initiating a transition from a standard operating mode to a shipping mode of a vehicle associated with the key fob; and
   transmitting a shipping mode instruction signal from a communication device mounted in the vehicle to the key fob, the shipping mode instruction signal instructing the key fob to transition from the standard operating mode to the shipping mode, the transmission of the shipping mode instruction signal being triggered by the detection of the vehicle state indicative of the vehicle shipping mode operation having been performed.

2. The method according to claim 1, wherein the shipping mode instruction signal is transmitted to the key fob following performance of the vehicle shipping mode operation and prior to the vehicle transitioning to the shipping mode.

3. The method according to claim 1, further comprising:
   receiving the transmitted shipping mode instruction signal at the key fob and transitioning the key fob from the standard operating mode to the shipping mode following receipt of the shipping mode instruction signal by the key fob.

4. The method according to claim 3, wherein transitioning the key fob to the shipping mode includes disabling all communication related functions of the key fob.

5. The method according to claim 3, wherein transitioning the key fob to the shipping mode includes entirely powering-off the key fob.

6. The method according to claim 1, further comprising, prior to detecting the vehicle state indicative of the vehicle shipping mode operation having been performed, performing the vehicle shipping mode operation to initiate transition of the vehicle from the standard operating mode to the shipping mode.

7. The method according to claim 6, wherein performing the vehicle shipping mode operation includes removing a shipping fuse from a vehicle fuse box, removal of said shipping fuse disabling at least a portion of key fob related communication functions of the vehicle.

8. The method according to claim 7, wherein removal of the shipping fuse disables at least one of remote keyless entry and SMART key related communication functions of the vehicle.

9. The method according to claim 7, wherein performing the vehicle shipping mode operation further includes actuating a vehicle power switch, the actuation of said vehicle power switch transmitting a vehicle power-off signal instructing a power-off of the vehicle.

10. The method according to claim 9, wherein the shipping mode instruction signal is transmitted from the communication device mounted in the vehicle subsequent to the removal of the shipping fuse and the actuation of the vehicle power switch, and prior to power-off of the vehicle.

11. A key fob shipping mode transitioning system, comprising:
    a key fob configured to be operable in at least a standard operating mode and a battery conserving shipping mode, and to transmit and receive signals;
    a communication device mounted in a vehicle associated with said key fob, said communication device configured to transmit signals to and receive signals from said key fob; and
    a shipping mode controller configured to detect a vehicle state indicative of a vehicle shipping mode operation having been performed, said vehicle shipping mode operation being an operation performed to at least partially initiate a transition of the vehicle from a standard operating mode to a shipping mode, the shipping mode controller further configured to control the communication device to transmit a shipping mode instruction signal to the key fob following detection of the vehicle state indicative of the vehicle shipping mode operation having been performed and prior to completion of the transition of the vehicle to the shipping mode, said shipping mode instruction signal instructing the key fob to transition from the standard operating mode to the shipping mode.

12. The system according to claim 11, wherein transitioning the key fob to the shipping mode includes disabling all communication related functions of the key fob.

13. The system according to claim 11, wherein transitioning the key fob to the shipping mode includes entirely powering-off the key fob.

14. The system according to claim 11, wherein the shipping mode controller is configured to detect removal of a shipping fuse from a vehicle fuse box as at least part of a vehicle state indicative of the vehicle shipping mode operation having been performed.

15. The system according to claim 11, wherein the shipping mode controller is configured to detect removal of a shipping fuse from a vehicle fuse box and an actuation of a vehicle power switch to transmit a power-off signal, said vehicle state indicative of the vehicle shipping mode operation having been performed being detected when the shipping controller detects removal of the shipping fuse from the vehicle fuse box and actuation of the vehicle power switch to transmit the power-off signal.

16. The system according to claim 11, wherein the key fob includes at least one button and is configured to transition from the shipping mode to the standard operating mode when a predetermined key fob button combination is pressed.

17. A shipping mode controller for controlling a key fob to transition between a standard operating mode and a battery conserving shipping mode, comprising:
    a shipping fuse state detecting section configured to detect removal of a shipping fuse from a vehicle fuse box, said shipping fuse being provided such that removal thereof at least partially transitions a vehicle into a shipping mode; and
    a vehicle communication device controller configured to control a vehicle communication device to transmit a shipping mode instruction signal to the key fob following detection of removal of the shipping fuse from the vehicle fuse box by the shipping fuse state detecting section, the shipping mode instruction signal instructing the key fob to transition from the standard operating mode to the shipping mode.

18. The controller according to claim 17, further comprising a vehicle power switch actuation detection section configured to detect actuation of a vehicle power switch to transmit a power-off signal which initiates power-off of the vehicle,
    wherein the vehicle communication device controller is configured to control the vehicle communication device to transmit the shipping mode instruction signal to the key fob upon detection of removal of the shipping fuse from the vehicle fuse box by the shipping fuse state detecting section and detection of actuation of the vehicle power switch to transmit the power-off signal by the vehicle power switch actuation detection section.

19. The controller according to claim 18, wherein the vehicle communication device controller is configured to control the vehicle communication device to transmit the shipping mode instruction signal to the key fob prior to power-off of the vehicle initiated by the actuation of the vehicle power switch to transmit the power-off signal.

20. The controller according to claim 17, wherein the shipping mode instruction signal instructs the key fob to transition to the shipping mode by instructing the key fob to disable all communication related functions.

* * * * *